(12) United States Patent
Beck et al.

(10) Patent No.: US 10,562,059 B2
(45) Date of Patent: Feb. 18, 2020

(54) DEVICES AND METHODS FOR THE CONTROLLED FORMATION AND DISPENSION OF SMALL DROPS OF HIGHLY VISCOUS AND/OR NON-NEWTONIAN LIQUIDS

(71) Applicant: PALO ALTO RESEARCH CENTER INCORPORATED, Palo Alto, CA (US)

(72) Inventors: Victor Beck, Menlo Park, CA (US); David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 203 days.

(21) Appl. No.: 15/709,975

(22) Filed: Sep. 20, 2017

(65) Prior Publication Data

US 2018/0021801 A1    Jan. 25, 2018

Related U.S. Application Data

(63) Continuation of application No. 14/575,922, filed on Dec. 18, 2014, now Pat. No. 9,782,790.

(51) Int. Cl.
*B05B 17/04* (2006.01)
*B01J 13/00* (2006.01)

(52) U.S. Cl.
CPC .......... *B05B 17/04* (2013.01); *B01J 13/0095* (2013.01)

(58) Field of Classification Search
None
See application file for complete search history.

(56) References Cited

U.S. PATENT DOCUMENTS

| 2,291,046 A | 7/1942 | Lange |
| 2,296,861 A | 9/1942 | Matter |
| 3,626,833 A | 12/1971 | Koch |
| 3,649,829 A | 3/1972 | Randolph |
| 3,702,258 A | 11/1972 | Gibbons et al. |

(Continued)

OTHER PUBLICATIONS

Wagner (Polymer Fiber Processing: The Rheotens Test, Encyclopedia of Materials: Science and Technology, pp. 7284-7288, 2001.*

(Continued)

*Primary Examiner* — Charles Capozzi
(74) *Attorney, Agent, or Firm* — Miller Nash Graham & Dunn LLP (57) ABSTRACT

A controlled-volume spray deposition system has a fluid feed system including a pair of bi-directional, counter-rotating rollers to dispense fluid as a first surface, the rollers operable to rotate in a first direction to dispense the fluid, a second surface positioned to receive the fluid when the rollers rotate in the first direction, and the rollers operable to rotate in a second direction to retract the fluid to cause the fluid to stretch and form a filament until it breaks to form a spray. A method of generating a controlled-volume spray includes feeding fluid between two counter-rotating rollers as a first surface as they rotate in a first direction until the fluid contacts a second surface, reversing the counter-rotating rollers such that they pull the fluid to form a fluid filament, and causing the filament to break into a spray.

6 Claims, 11 Drawing Sheets

(56) References Cited

U.S. PATENT DOCUMENTS

| | | | |
|---|---|---|---|
| 3,717,875 | A | 2/1973 | Arciprete et al. |
| 3,873,025 | A | 3/1975 | Qvarnstrom |
| 3,926,114 | A | 12/1975 | Matuschke |
| 4,034,670 | A | 7/1977 | Zavodny |
| 4,046,931 | A | 9/1977 | Innes et al. |
| 4,222,059 | A | 9/1980 | Crean et al. |
| 4,384,296 | A | 5/1983 | Torpey |
| 5,314,119 | A | 5/1994 | Watt |
| 5,326,598 | A | 7/1994 | Seaver et al. |
| 6,033,513 | A | 3/2000 | Nakamura |
| 6,382,524 | B1 | 5/2002 | James |
| 6,576,861 | B2 | 6/2003 | Sampath et al. |
| 6,622,335 | B1 | 9/2003 | Anderson et al. |
| 6,934,142 | B2 | 8/2005 | Grosse et al. |
| 7,083,830 | B2 | 8/2006 | Minko |
| 8,132,744 | B2 | 3/2012 | King et al. |
| 8,272,579 | B2 | 9/2012 | King et al. |
| 8,511,251 | B2 | 8/2013 | Sato |
| 8,720,370 | B2 | 5/2014 | Rebstock |
| 9,021,948 | B2 | 5/2015 | Pattekar |
| 2002/0053320 | A1 | 5/2002 | Duthaler et al. |
| 2002/0102324 | A1* | 8/2002 | Groleau ............... B29C 45/46 425/567 |
| 2006/0035033 | A1 | 2/2006 | Tanahashi et al. |
| 2015/0115057 | A1 | 4/2015 | Beck et al. |
| 2016/0175874 | A1 | 6/2016 | Beck et al. |

OTHER PUBLICATIONS

Heeley (Effect of processing parmeters on the morphology development during extrusion of polyethylene tape: An in-line small-angle X-ray scattering study, Polymer, vol. 54, pp. 6580-6588 (2013).*

Bhat, Pradeep P., "Formation of beads-on-a-string structures during break-up of viscoelastic filaments," Aug. 2010, vol. 6:625-631, Nature Physics, 7 pages.

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

Shi, X.D., "A Cascade of Structure in a Drop Falling from a Faucet," Jul. 8, 2004, vol. 265:219-222, Science, 4 pages.

Chapter 15, "Ink Jet Printing", 14 pages, found at http://www.lintech.org/comp-per/15INK.pdf.

Marple, A. and Liu, Y.H.: "Characteristics of Laminar Jet Impactors", Environmental Science & Technology, vol. 8, No. 7, Jul. 1974, pp. 648-654.

Bailey, Adrian G.: "The Science and technology of electrostatic powder spraying, transport and coating", Journal of Electrostatics, vol. 45, 1998, pp. 85-120.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, found at: http://www.ppsc-journal.com.

Kelly, Ryan T, et al..: "The ion funnel: theory, implementations, and applications", Mass Spectrometry Reviews,vol. 29, 2010, pp. 294-312.

Crowe, Clayton et al.: "Multiphase Flows With Droplets and Particles", CRC Press, LLC, 1998.

Non-Final Office Action for U.S. Appl. No. 14/066,435, dated Jan. 21, 2016, 29 pages.

Sankara, et al., "Effect of viscoelasticity on liquid transfer during gravure printing," J. Non-Newtonian Fluid Mechanics, 175-176 (2012) pp. 64-75.

James and Pouran "Droplet formation in quickly stretched fluid filaments," Rheol Acta (2009) 48:611-624.

* cited by examiner

DEVICES AND METHODS FOR THE CONTROLLED FORMATION AND DISPENSION OF SMALL DROPS OF HIGHLY VISCOUS AND/OR NON-NEWTONIAN LIQUIDS

CROSS REFERENCE TO RELATED APPLICATION

This application is a continuation of U.S. patent application Ser. No. 14/575,922 filed Dec. 18, 2014, which is incorporated herein by reference in its entirety.

TECHNICAL FIELD

The disclosed methods and systems relate to spray deposition systems and methods and more specifically to the controlled formation and dispensation of droplets in such systems.

BACKGROUND

Many medical manufacturing, and industrial applications would benefit from fluid atomization or spray deposition to create a fine vapor mist or aerosol, such as administering small quantities of pharmaceuticals in the medical industry and the precision bonding required in microelectronics fabrication and processing. Specifically, small, controlled volumes of mist are required in these applications. Many of the fluids, such as the pharmaceutical drugs and microelectronics adhesives, are highly viscous and/or have non-Newtonian properties or generally complex rheologies, which makes these fluids difficult to atomize because of their shear thinning or strong extensional thickening properties. Such properties make droplet formation difficult because they delay the onset of capillary instability and hence the break-up of the fluid into droplets.

Many conventional spray deposition systems use highly pressurized air to help generate droplets of highly viscous fluids or fluids that have non-Newtonian properties. For example, some conventional systems use nozzle spraying, air-blast atomization techniques, and rotary atomization to create droplets although even these systems tend to have difficulties in creating the droplets and, more specifically, in creating small quantities and/or controlled dosing of the droplets.

Some mechanical spray deposition systems are able to atomize highly viscous and/or non-Newtonian fluids by using diverging surfaces, such as a pair of diverging pistons and/or a pair of counter-rotating rollers. These systems stretch fluid between the diverging surfaces until fluid filaments form. The applied strain or continuous stretching to the fluid filaments causes them to stretch until beyond the point at which the fluid filament break up from capillary forces, meaning the fluid filaments exceed their capillary break-up point and break into droplets. The diverging surface-type spray deposition systems produce large volumes of spray droplets.

Therefore, the spray deposition art would greatly benefit from systems and methods that can create small, controlled volumes of droplets.

SUMMARY

One embodiment is a controlled-volume spray deposition system has a fluid feed system including a pair of bi-directional, counter-rotating rollers to dispense fluid as a first surface, the rollers operable to rotate in a first direction to dispense the fluid, a second surface positioned to receive the fluid when the rollers rotate in the first direction, and the rollers operable to rotate in a second direction to retract the fluid to cause the fluid to stretch and form a filament until it breaks to form a spray.

Another embodiment is a method of generating a controlled-volume spray includes feeding fluid between two counter-rotating rollers as a first surface as they rotate in a first direction until the fluid contacts a second surface, reversing the counter-rotating rollers such that they pull the fluid to form a fluid filament, and causing the filament to break into a spray.

BRIEF DESCRIPTION OF THE DRAWINGS

FIG. 1 is an example of a spray deposition system with a pair of pistons according to aspects of the disclosure.

FIG. 2 is another spray deposition system with a pair of pistons in accordance with aspects of the disclosure.

FIG. 3 is an example spray deposition system with a nozzle and a piston according to the disclosure.

FIG. 4 is still another example spray deposition system with a nozzle and a piston in accordance with aspects of the disclosure.

FIG. 5 is another example spray deposition system with a nozzle and a piston.

FIG. 6 is yet another example spray deposition system with a nozzle and a piston.

FIG. 7 is an example fluid feed system.

FIG. 8 is another example fluid feed system.

FIG. 9 is an example spray deposition system with a pair of counter-rotating rollers and a piston.

FIG. 10 is another example spray deposition system with a pair of counter-rotating rollers and a piston.

FIG. 11 is still another example spray deposition system with a single roller and a piston.

FIGS. 12A-12H are various examples of piston surface geometries.

DETAILED DESCRIPTION

The disclosed systems and methods can form small, controlled volumes of droplets from highly-viscous fluids and/or fluids having non-Newtonian properties in a mechanical system and without the use of assistive techniques like using highly pressurized air to control the droplets after they are formed. The mechanical nature of the disclosed systems and methods simplifies the process of creating the droplets and helps control the droplets after they are formed. Also, by using a mechanical system, the droplet size can be controlled, which leads to broadening the applications that can use fluid atomizers.

For example, a controlled-volume spray deposition system has a fluid feed system and a surface. The fluid feed system is spaced apart from the surface and is also positioned so that fluid can be caused to stretch between the fluid feed system and the surface. The stretching of the fluid forms fluid filaments and when the stretched fluid filaments exceed their capillary break-up points, they break into a controlled-volume of droplets. The "capillary break-up point" for a fluid is the point at which a stretched filament breaks up from capillary forces. Excess fluid from the broken fluid filaments retracts back onto one or both of the fluid feed system and the surface.

The fluid is stretched using fluid extension atomization techniques, such as stretching fluid between two diverging surfaces. Such fluid extension atomization techniques generally are capable of atomizing fluids that are highly viscous and/or fluids that have non-Newtonian properties or other complex rheologies by using purely mechanical means. Some fluid extension atomizers may have additional, non-mechanical means that help to control or otherwise manipulate the fluid, the surfaces, or the harvesting of the formed droplets. In the example fluid extension atomizers with diverging surfaces, the surfaces can be one or more rotating rollers, one or more pistons, one or more flat surfaces or blocks, or any other shaped, textured, or contoured surface, or any combination thereof. The fluid extension atomizers can also have multiple, parallel fluid extension atomizers that individually stretch a controlled volume of the fluid, and together generate a collective volume of a controlled amount of the fluid.

The fluid is dispensed into the controlled-volume spray deposition system using the fluid feed system. The fluid feed system can be any suitable fluid feed system, such as any conventional surface or pan coating technique. As discussed above, the disclosed systems and methods can control the atomization of any highly-viscous fluids and/or those fluids having non-Newtonian properties. The examples herein discuss highly-viscous fluids and/or fluids with non-Newtonian properties because these fluids tend to be more difficult to atomize that other fluids having less complex rheologies. All fluids having complex and less complex rheologies can be atomized using the disclosed systems and methods.

In an example, the fluid feed system is a permeable, meaning that the surface of the fluid feed system either has a surface with one or more through holes through which the fluid is dispensed, the fluid feed system is a pair of rollers between which the fluid is dispensed, or the fluid feed system is a single roller with one or more through holes through which the fluid is dispensed into the controlled-volume spray deposition system. The permeable nature of the fluid feed system allows for greater control in dispensing the fluid to be stretched between the fluid feed system and the surface.

For example, the controlled-volume spray deposition system has a fluid feed system that is a flat, piston surface that has a through hole of a fixed diameter. A controlled volume of the fluid can be dispensed through the fixed-diameter through hole, which meters the amount of the fluid dispensed between the fluid feed system and the surface. Controlling the amount of fluid that is dispensed into the system in turn controls the size of the fluid filament and thus the point at which the fluid filament breaks into droplets.

The effects of controlling the introduction of the fluid into the system at the start of the atomization process allows for multiple aspects of the fluid atomization process to be controlled. The flat, piston surface can have any suitable number of through holes and the number of through holes can be determined by the number of fluid filaments that need to be stretched and/or the volume of formed droplets that need be generated. Other example permeable fluid feed systems are discussed below in more detail, including examples with a pair of counter-rotating rollers and other examples with a single roller with one or more through holes.

By controlling the volume of fluid that is dispensed by the fluid feed system, the size of the formed droplets can also be controlled. In the example discussed above with a fluid feed system having a flat, piston surface with a through hole, the size of the through hole can determine the thickness of the fluid dispensed and thus also controls the thicknesses of the fluid filaments that are stretched and ultimately controls how the fluid filaments break into droplets. The thickness of the fluid filaments can also control the size of the formed droplets; thinner fluid filaments break into droplets with a smaller diameter than the larger diameter droplets that are generated from thicker fluid filaments.

Figure 1:
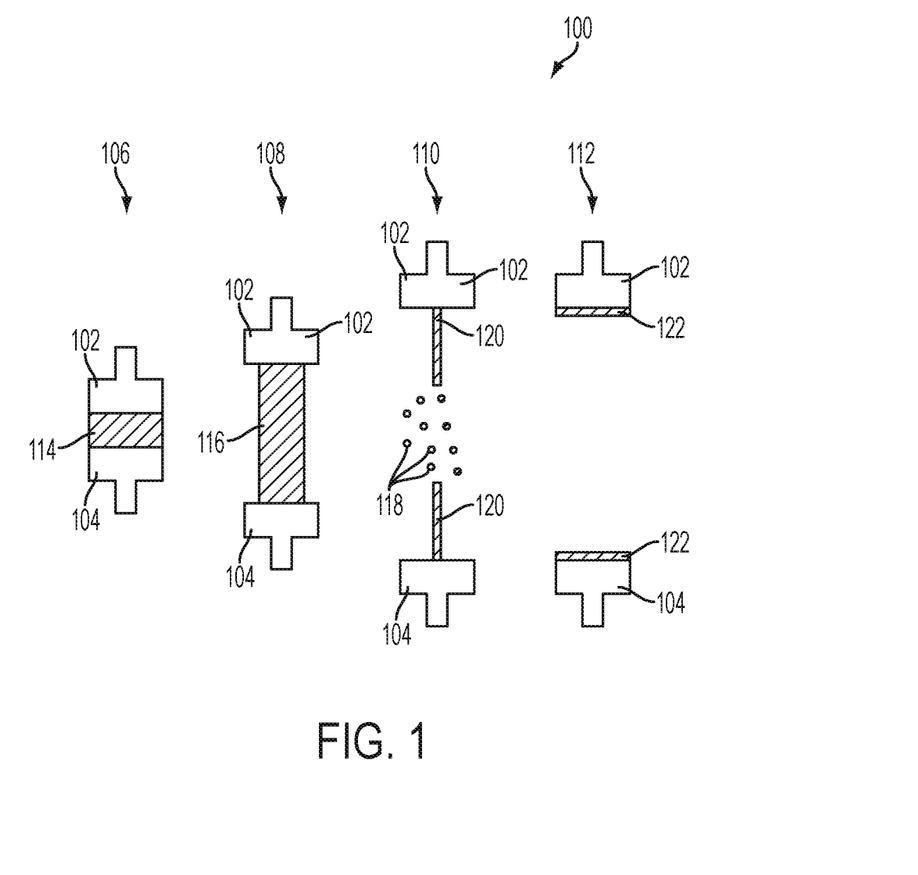

The pistons themselves are generally larger than the diameter of the filament at the point of capillary break-up of the fluid. The atomized droplets can range from hundreds of nanometers to hundreds of microns depending on the desired use of the spray corresponding to piston sizes approximately ranging from microns to centimeters in diameter. The method of actuating the disclosed pistons can be developed by someone skilled in the art and would depend on the overall size of the piston and the desired operation of the completed spray deposition system. For example, a ten micron diameter piston could be actuated with micro-actuation techniques such as a piezoelectric stack while a centimeter diameter piston can be actuated with a conventional linear actuator such as a leadscrew or pneumatic actuator.

One or both of the fluid feed system and the surface can be moveable with respect to each other. For example, the fluid feed system is moveable towards the surface, which is stationary. The fluid feed system moves towards the surface, dispenses a controlled amount of fluid so that the fluid contacts the surface, then moves away from the surface, which causes the fluid to be stretched between the fluid feed system and the surface. In another example, the fluid feed system and the surface are both moveable towards and away from each other and in still other examples the fluid feed system is stationary and the surface is moveable towards and away from the fluid feed system. Specific examples of how the fluid feed system and the surface are moveable are discussed in more detail below.

In all of the example controlled-volume spray deposition systems, after the fluid filament(s) break, some excess fluid can relax and retract back onto one or both of the fluid feed system and the surface. In some examples, the excess fluid is removed from the system altogether and in other examples the excess fluid is recycled within the system so that it is again dispensed from the fluid feed system and stretched into fluid filaments and ultimately breaks into droplets or again retracts to the fluid feed system and/or the surface. The excess fluid can be recycled any number of times. Any quality control mechanisms can also monitor and/or test the recycled fluid for abnormalities or impurities before recycling the fluid back into the fluid feed system.

Referring now to FIG. 1, an example controlled-volume spray deposition system 100 is shown. The system 100 has two pistons 102, 104 that are moveable towards and away from each other along a vertical axis, in this example, although the pistons can move along other axes, both linear and non-linear, in other example systems. FIG. 1 shows a progression of movement 106, 108, 110, 112 of the pistons 102, 104 as the pistons 102, 104 are coated with fluid 114, then the pistons 102, 104 are moved along the vertical axis away from each other, which causes the fluid 114 to stretch between the pistons to form a fluid filament 116 and ultimately breaks into droplets 118. In this example, the fluid feed system is the fluid-coated piston(s) 102, 104 and the surface between which the fluid 114 is stretched is the opposing piston 104.

In their first position 106, the pistons 102, 104 are positioned close to each other and fluid coats at least one of the pistons 102, 104. In the example shown in FIG. 1, the upper piston 102 is coated with the fluid 114. The pistons 102, 104 are both moveable in this example, as shown by the second 108, third 110, and fourth 112 positions of the progressive movement of the pistons 102, 104. In their second position 108, the fluid 114 begins to stretch and forms a fluid filament 116. In their third position 110, the pistons 102, 104 are moved even further apart than they were in the second position 108 and the strain applied to the fluid filament 116 causes it to exceed its capillary break-up point and break into a controlled-volume of multiple droplets 118 and excess fluid 120. The controlled-volume of droplets 118 is harvested by any suitable means (not shown).

The excess fluid 122 relaxes away from the formed droplets 118 and retracts back to both pistons 102, 104, as shown in the fourth position 112 of the pistons 102, 104. In this example, the distance between the pistons 102, 104 in the third 110 and fourth 112 positions is about the same. The retracted fluid 122 can be recycled. In this example, the pistons 102, 104 can again be moved back to the first position 106 and the retracted fluid becomes a recycled version of the fluid coating the pistons 102, 104. The recycled fluid can be stretched and broken as many times as desired.

Figure 2:
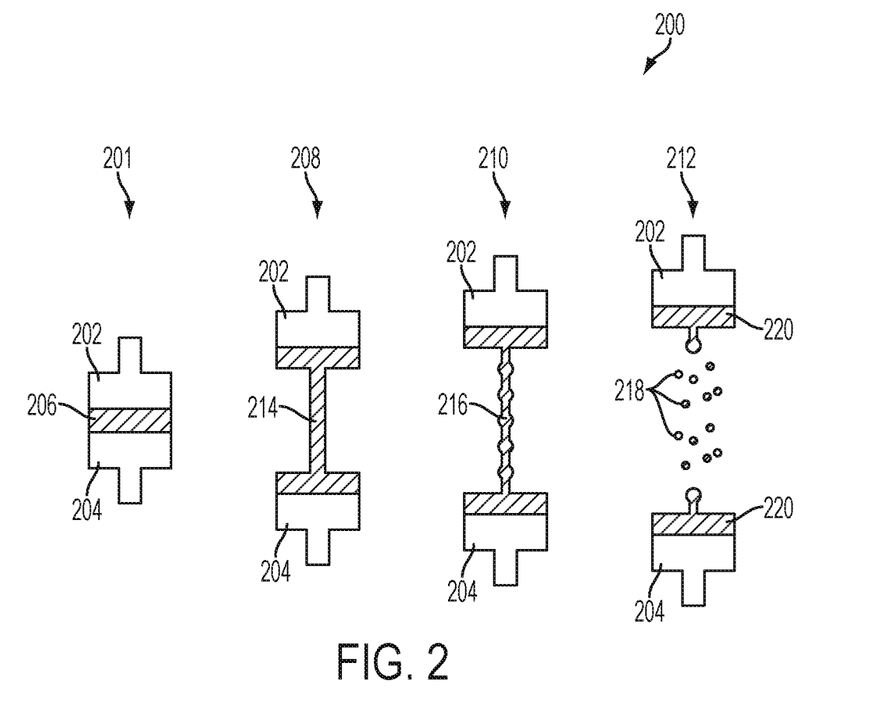

FIG. 2 shows another example controlled-volume spray deposition system 200 with two pistons 202, 204 that are moveable towards and away from each other along a vertical axis. One or both of the upper piston 202 and the lower piston 204 are coated with fluid that are moved together so that both pistons 202, 204 are coated and the fluid 206 extends between the pistons 202, 204, as shown in the first position 201. The pistons 202, 204 are moved to a fixed distance apart from the other and held there, which causes the fluid to drain from the fluid filament towards the pistons 202, 204 in opposing directions, which in turn applies additional strain to the fluid. In the second 208, third 210, and fourth 212 positions, the pistons 202, 204 are spaced part the same distance, which causes the fluid filaments to drain. In the second position 208, the applied strain from the fluid filaments draining causes the fluid to stretch into a fluid filament 214.

Again, the third 210 and fourth 212 positions have the pistons 202, 204 positioned the same distance apart with continuously applied strain. The fluid filament 214 from the second position 208 becomes a fluid filament in a beads-on-a-string structure 216 in the third position 210. The continuous draining of the fluid filaments creates a beads-on-a-string structure 216 in the third position 210 and additional strain applied by more draining eventually causes the beads-on-a-string structure 216 to exceed its capillary break-up point and break into multiple droplets 218 and excess fluid 220 in the fourth position 212. The fluid filament draining progresses the stretched fluid filament until it exceeds its capillary break-up point and the droplets 218 are formed.

Figure 3:
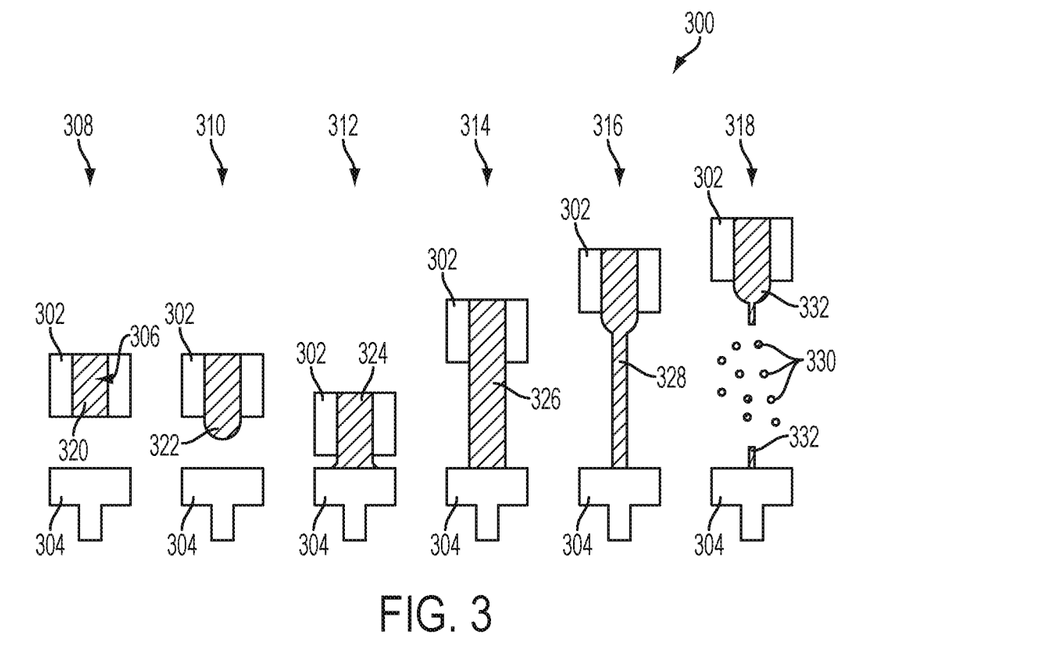

FIG. 3 shows another example controlled-volume spray deposition system 300. This example system 300 has a nozzle 302 as its fluid feed system and a piston 304 as its opposing surface. The nozzle 302 in this example has a through hole 306 through which fluid is dispensed. The nozzle 302 is moveable towards and away from the piston 304 in this example, although the piston 304 can be moveable in other examples, as discussed below. In the first position 308, a fluid 320 flows through the through hole 306 in the nozzle 302 at a fixed distance away from the piston 304. The fluid 322 exits the through hole 306 of the nozzle 302 in a direction along a vertical axis towards the piston 304.

Surface tension of the dispensed fluid 322 may prevent the fluid 322 from easily extending down towards the piston 304. The nozzle 302 is moved along the vertical axis towards the piston 304, as shown in the third position 312 to cause the fluid 324 to contact the piston 304, which maximizes the amount of strain that is applied when the nozzle 302 is moved back away from the piston 304. The nozzle 302 is then moved away from the piston 304 in a direction along the vertical axis to stretch the fluid 326 between the nozzle 302 and the piston 304. The nozzle 302 is moved further away from the piston 302 along the same axis in the fourth position 316 to cause the fluid to stretch thinner 328. In the fifth position 318, the stretched fluid filament exceeds its capillary break-up point and breaks into multiple droplets 330 and excess fluid 330. The excess fluid 330 then relaxes and retracts back into the through hole of the nozzle 302 and onto the piston 304.

After the fluid is dispensed from the nozzle 302 and it contacts the piston 304, the nozzle 302 alternatively can be moved to a fixed position spaced apart from the stationary piston 304 to apply a continuous strain to the fluid. As discussed above in regards to the system 200 shown in FIG. 2, applying a continuous strain to a fluid causes it to stretch into a fluid filament and eventually exceed its capillary break-up point and form droplets and excess fluid.

Figure 4:
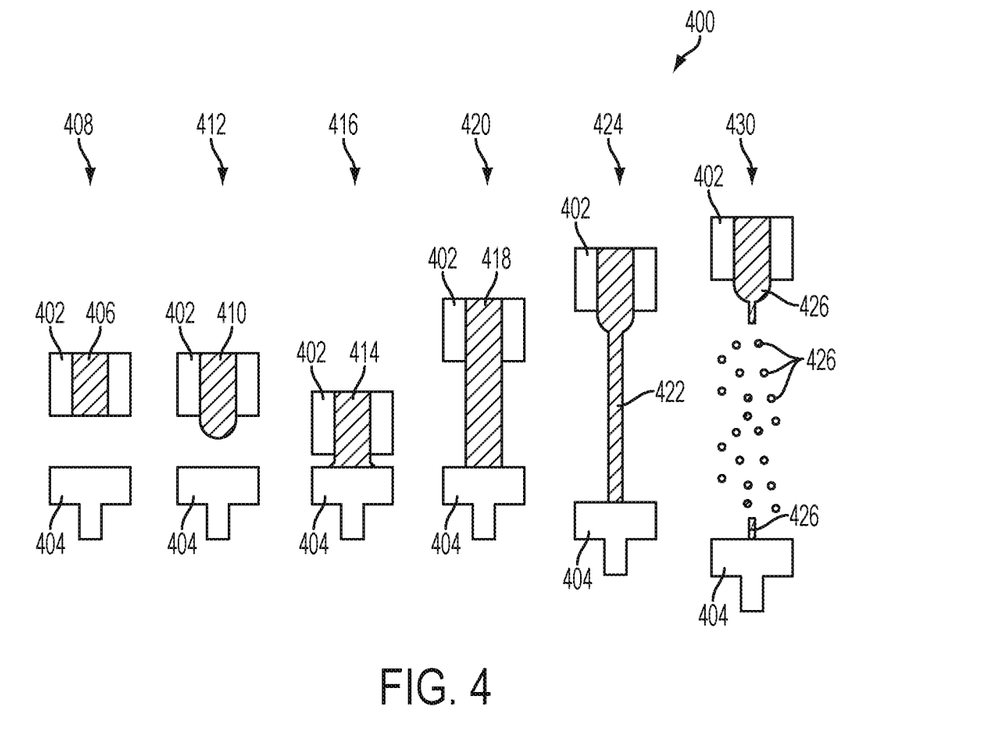

The example controlled-volume spray deposition 400 shown in FIG. 4 is similar to the examples shown in FIG. 3 in that it also has a nozzle 402 and an opposing piston 404. The nozzle 402 has a through hole through which fluid 406 is dispensed, as shown in the first position 408 of FIG. 4. The fluid 410 is dispensed from the nozzle 402 in the second position 412 and the fluid's surface tension forms a rounded end on the dispensed fluid 410. The nozzle 402 is moved towards the piston 404 to cause the dispensed fluid 414 to contact the piston 404, as shown in the third position 416, to maximize the strain applied to the fluid when the nozzle 402 and the piston 404 are moved away from each other.

The nozzle 402 is then moved away from the piston 404, which causes the fluid to stretch between the nozzle 402 and the piston 404, as shown in the fourth position 420. Both the nozzle 402 and the piston 404 are moved away from each other to further stretch the fluid into a fluid filament 422, as shown in the fifth position 424. In the sixth position 430, the nozzle 402 and the piston 404 are moved even further away from each other, which causes the fluid filament to further drain and then exceed its capillary break-up point and break into droplets 426 and excess fluid 428. The controlled-volume spray deposition systems 300, 400 shown in FIGS. 3 and 4 both have nozzles 302, 402 that move towards and away from the piston 404.

In an alternative example system, the nozzle remains stationary and the piston moves towards the nozzle to contact the fluid, then moves away from the nozzle to stretch the fluid into a fluid filament and ultimately break it into droplets and excess fluid, either by continuing to move further away from the nozzle until the fluid filament breaks or by moving to a fixed position away from the nozzle and allowing the draining of the filament to apply continuous strain to the fluid filament until it breaks.

Each of the disclosed example spray deposition systems with the nozzles can control the amount of fluid dispensed from the nozzle, which in turn controls the size of the fluid filament, which ultimately controls the number and size of droplets generated. A nozzle can dispense a precise volume of fluid and stretch the fluid a precise distance and/or with a precise amount of strain by metering the fluid being dispensed and by controlling the thickness of the dispensed fluid according to the fixed diameter of the nozzle's through hole and the known viscosity and flow rate of the fluid. Still further, in the example systems with nozzles that move with respect to the piston, the nozzle can move to a position that is a specified distance away from the piston to cause the fluid to drain at a particular corresponding rate. Each of these factors are purely mechanical ways to control the volume, thickness, and application of the fluid before it is stretched between the nozzle and the piston.

Figure 5:
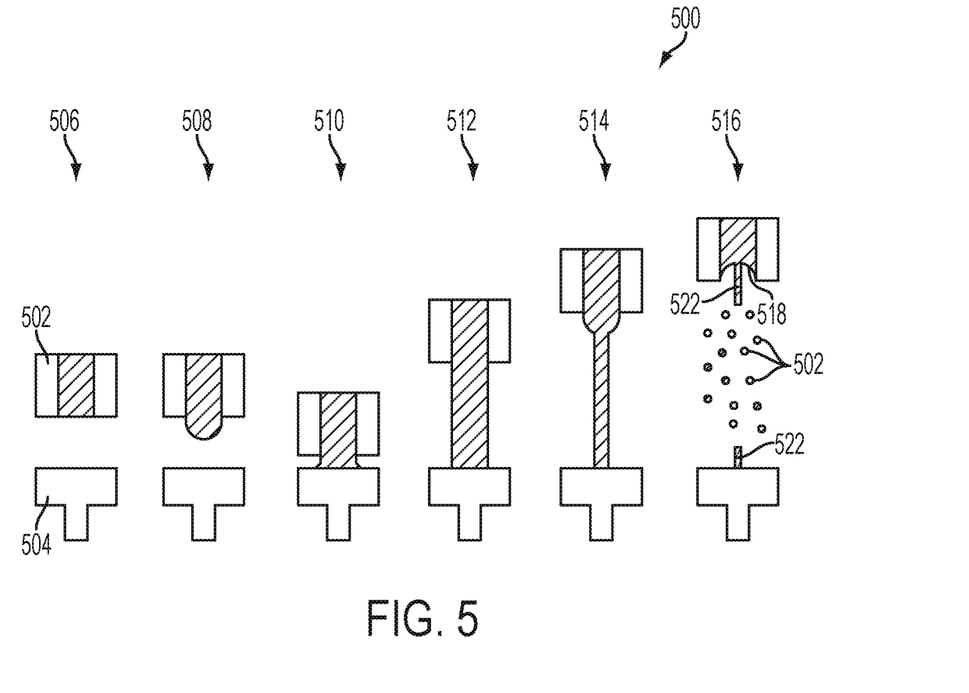

FIG. 5 shows another example controlled-volume spray deposition system 500 with a moveable nozzle 502 and a stationary piston 504. The nozzle 502 dispenses the fluid and moves to stretch the fluid in the same manner as discussed above in regards to FIG. 3 between the first 506, second 508, third 510, fourth 512, and fifth 514 positions. However, in the sixth position 516, the system 500 applies a vacuum to the nozzle opposite the stretched fluid filament to cause the fluid to aspirate and be pulled back through the through hole of the nozzle 502, in this example. The aspirated fluid within the through hole of the nozzle forms a convex shape and further stretches the fluid filament to cause it to exceed its capillary break-up point and break into droplets 502 and excess fluid 522. In other examples, aspiration is applied at any time during the fluid stretching process and may or may not form a convex shape within the nozzle. The force of the aspirated fluid can be applied to the nozzle through hole by an aspiration element (not shown) or any other suitable element that is capable of drawing the fluid in a direction away from the piston 504 and retracting at least a portion of the fluid back into the nozzle through hole itself.

A vacuum or any other suitable way to aspirate the fluid to any other portion of the system and/or the fluid. For example, the piston could also include an opening and the fluid could be dispensed such that it contacts the piston and covers the opening. A vacuum could then be applied to the opening to cause fluid contacting the piston to be drawn into the opening to further control the manner in which the fluid is stretched.

Figure 6:
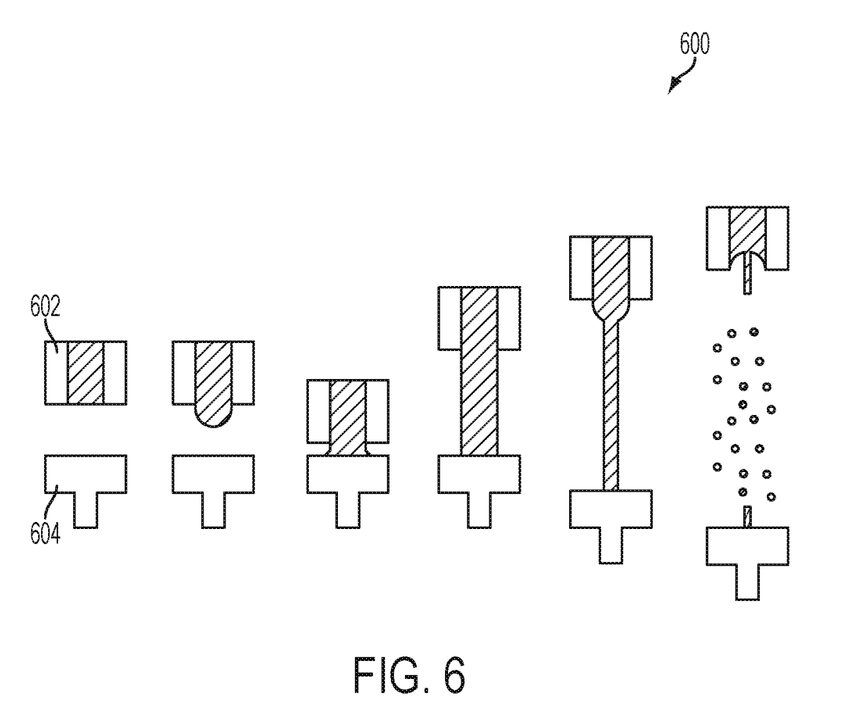

FIG. 6 shows another example controlled-volume spray deposition system 600 that is very similar to the example system shown in FIG. 5 and has a nozzle 602, an opposing piston 604, and an aspiration element that can cause the fluid to be drawn back into the through hole of the nozzle. However, in the example shown in FIG. 6, the piston 604 is also moveable as well as the nozzle 602 being moveable. The ability of both the nozzle and the piston to move and the aspiration element that draws fluid back into the nozzle provides precise control over the manner in which the fluid is stretched and breaks into droplets and thus the resulting volume and size of the generated droplets. The fluid flow from the nozzle could be controlled mechanically or pneumatically in any of the disclosed nozzle example systems and methods.

Figure 7:
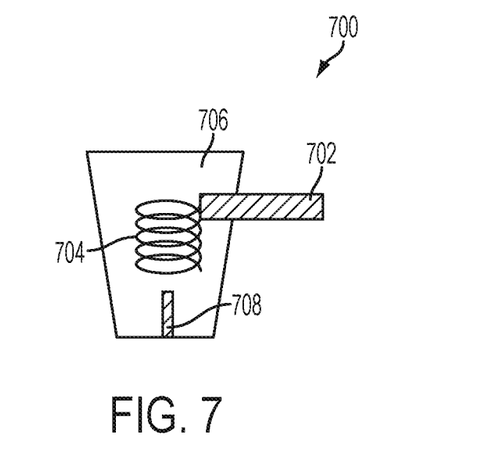
Figure 8:
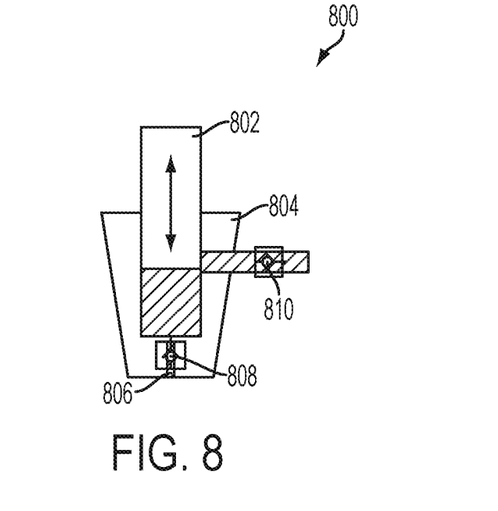

FIGS. 7 and 8 shows example fluid feed systems 700, 800 for any of the disclosed controlled-volume spray deposition systems. Each of the fluid feed systems 700, 800 are positive displacement pumps that select a precise volume of fluid to push into a space, like the nozzles or the nip of the counter-rotating rollers in the example spray deposition systems discussed above. In some examples, manifolding is connected between the disclosed fluid feed systems 700, 800 and the nozzle(s), rollers, or other fluid feed system. The combination of the fluid feed systems 700, 800 shown in FIGS. 7 and 8 and the nozzles, pistons, and/or roller(s) with any optional connecting manifolding between them together create the fluid feed system.

FIG. 7 shows an Auger valve feed system 700 that can be used with another dispenser, such as the nozzles and roller(s) examples discussed above. The Auger valve feed system 700 has a screw 702 that controls a rotatable coil 704. The rotatable coil 704 is positioned within a housing 706. The screw 702 extends through the housing 706 to contact and control the rotation of the rotatable coil 704. The linear motion of the screw 702 into and out of the housing 706 causes the coil 704 to rotate, which translates its linear motion into rotational motion of the coil 704. By controlling the motion of the screw 702, and thus the rotation of the rotatable coil 704, the Auger valve feed system 700 can dispense a precise volume and thickness of fluid through a dispensing tunnel 708.

FIG. 8 shows a piston fluid feed system 800, which is another type of controlled-volume dispenser that can be used with another dispenser, such as the nozzles or roller(s) discussed above. The piston fluid feed system 800 has a moveable piston 802 that moves into and out of a housing 804 to dispense the fluid through an opening 806. Two check valves 808, 810 help to regulate the pressure at which the fluid is dispensed. Depending on the viscosity of the fluid, the check valves may increase the pressure required for the piston pumping; however, a piston fluid feed system has the dispensing advantage of single-type motion of the piston causing the fluid to be dispensed, which simplifies its mechanics.

The type of fluid feed system can be selected based on any number of factors including the type of fluid to be dispensed and the volume, flow rate, and velocity of the fluid that is required during dispensing. Other fluid feed systems can be included in the disclosed controlled-volume spray deposition systems alternatively or in addition to the fluid feed systems 700, 800 shown in FIGS. 7 and 8.

Figure 9:
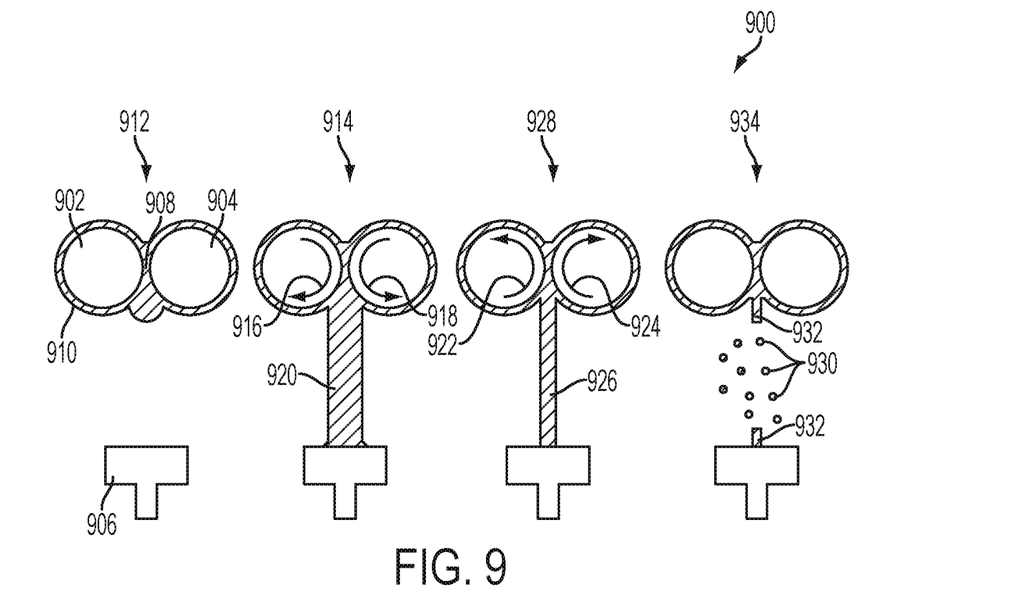
Figure 10:
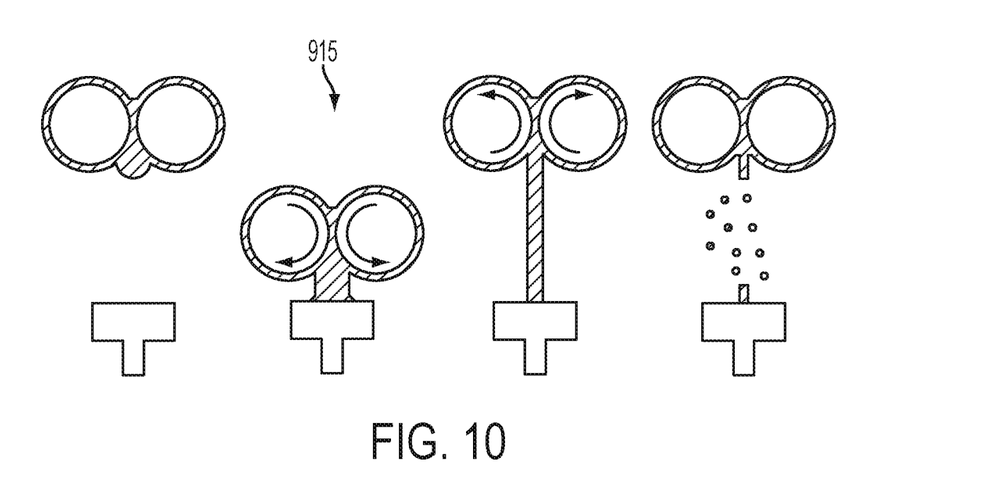
Figure 11:
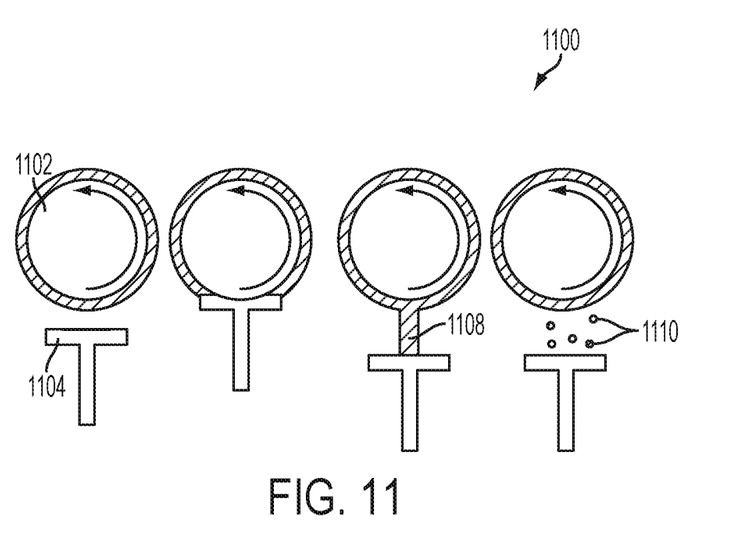

FIGS. 9-11 show other embodiments of the disclosed spray deposition systems. As discussed above in both the two piston and the nozzle and piston combination spray deposition systems, either or both of the fluid feed system and the surface can be moveable with respect to the other. FIG. 9 shows an example controlled-volume spray deposition system 900 that has a pair of counter-rotating rollers 902, 904 as its fluid feed system and a piston 906 as its opposing surface. Both the pair of counter-rotating rollers 902, 904 and the piston 906 remain stationary in this example. The pair of counter-rotating rollers 902, 904 defines a nip 908 between them through which fluid coating the rollers 902, 904 is drawn.

The rollers 902, 904 are coated with the fluid in any suitable way and elements like a doctoring blade or other device can help control the thickness of the fluid coating the rollers 902, 904. In part, the thickness of the fluid 910 coating the rollers 902, 904 and being drawn through the nip 908 determines the thickness of the fluid dispensed from the pair of rollers 902, 904 and thus also determines the formation of the fluid filaments and the droplets. The nip 908 also helps control the manner in which the fluid filaments and the droplets are formed. The nip 908 can be the space defined between the surfaces of the rollers 902, 904, as show in FIG. 9.

Alternatively, the rollers 902, 904 physically touch each other and the nip 908 is defined as the negative gap at the point at which the rollers 902, 904 touch each other and through which the rollers 902, 904 draw fluid. Regardless of its configuration, the nip 908 has an upstream side from which fluid is drawn and a downstream side at which the fluid is dispensed. Excess fluid that is not dispensed on the downstream side of the nip can relax back to the surface of the rollers and be recycled through the rotation of the rollers to be dispensed in the next cycle.

FIG. 9 shows the rollers 902, 904 in a first position 912 in which the rollers 902, 904 are each coated with the fluid 910 and fluid begins to be drawn through the nip 908. At this position, the rollers 902, 904 are stationary. The rollers 902, 904, however, are counter-rotatable and each are shown rotating in first counter-rotating directions 916, 918 as shown by the arrows in the second position 914 of FIG. 9. The rotation of the rollers 902, 904 in the first direction 916, 918 causes the fluid to be drawn through the nip 908 and to be dispensed towards the piston 906 on the downstream side of the nip 908, which in this example, is the side of the nip 908 nearest the piston 906. The fluid 920 is dispensed until is contact the piston 906 and extends between the nip 908 of the rollers 902, 904 and the piston 906.

The direction of rotation of the rollers 902, 904 is reversed to second directions 922, 924, which stretch the fluid into a fluid filament 926. By reversing the direction of rotation of the rollers 902, 904, some fluid is drawn back through the nip 908, which causes the fluid to stretch into the fluid filament 926, as shown in the third position 928 of FIG. 9. As discussed above in other embodiments, the fluid filaments can either be continuously stretched or are stretched to a fixed distance and allowed to drain until they eventually exceed their capillary break-up point and break into droplets. In the example shown in FIG. 9, the fluid filament is stretched to a fixed strain point until it breaks into droplets 930 and excess fluid 932, as shown in the fourth position 934. However, the rollers 902, 904 could be continuously rotated in the second direction 922, 924 until the fluid filament breaks into droplets 930 and excess fluid 932 in alternative examples.

FIG. 10 shows the controlled-volume spray deposition system shown in FIG. 9, however the pair of counter-rotating rollers 902, 904 are moveable towards and away from the piston, as shown in the second position of FIG. 10. Otherwise, the manner in which the rollers 902, 904 counter-rotate in opposing directions, cause the fluid to be drawn through the nip when the rollers 902, 904 rotate in the first direction, and cause the fluid to stretch by rotating the rollers 902, 904 in the second direction are the same. Being able to move the pair of rollers 902, 904 towards and away from the piston 904, however, provides control over the amount of time it takes for the fluid to contact the piston 906 after it is dispensed and thickness of the fluid that is dispensed and contacts the piston 906, which in turn controls the manner in which the fluid filament is stretched and the droplets are formed. Moving the pair of rollers 902, 904 and/or moving the piston 906 (not shown) are additional ways to control the generation of the droplets.

The rotation of the counter-rotating rollers 902, 904 shown in FIGS. 9 and 10 controls the droplets, as discussed above. By controlling both the velocity and acceleration of the rollers 902, 904, the formation of the fluid filaments and the droplets can be controlled. For example, the velocity and acceleration at which the fluid is dispensed onto the piston 906 and the velocity and acceleration of reversing the direction of the counter-rotation of the rollers 902, 904 to stretch the fluid filament increase the precision of controlling the droplet size and volume. Additionally, the pair of counter-rotating rollers 902, 904 control the strain-rate of the fluid filament, which provides precise control over the manner in which the fluid filament deforms as it is strained and the resulting droplets formed after it breaks. The pair of counter-rotating rollers also helps control the rate at which the droplets are formed by the velocity of the rotation of the rollers, which controls the throughput of the system to create the droplets.

Alternatively, the piston 906 shown in FIGS. 9 and 10 can be replaced with a second pair of counter-rotating rollers (not shown). In this case, two, separate pairs of counter-rotating rollers are positioned opposite each other. The first pair may be the fluid feed system that dispenses fluid from its nip towards the second pair of rollers. The fluid can contact the second pair of at the nip of the second pair of rollers. Either or both of the pairs of rollers can then reverse counter-rotation and stretch the fluid dispensed between them. As discussed above, either of both of the pairs of counter-rotating rollers can be moveable with respect to each other to further control the dispensing, stretching, and breaking of the fluid.

FIG. 11 is a spray deposition system 1100 with a single, stationary roller 1102 and a piston 1104. The single roller 1102 is coated with a fluid 1106. The piston 1104 can be continuously rotated and is moved towards the coated roller 1102 until it physically touches the fluid 1106 coating the roller 1102. The piston 1104 is then moved back away from the coated roller 1102 and the fluid is stretched between the roller 1102 and the piston 1104 to form a fluid filament 1108 therebetween. The piston 1104 remains at a fixed distance away from the roller 1102 to apply a continuous strain to the fluid filament and cause it to exceed its capillary break-up point and break into droplets 1110. Any excess fluid in the fluid filament that does not break into droplets either retracts back to the roller 1102 or the piston 1104 (not shown). In alternative examples, the roller can also move with respect to the moveable piston or the piston can remain stationary and the roller is moveable.

Any suitable fluid feed system can be included in the disclosed controlled-volume spray deposition systems. Many of the examples shown in FIGS. 3-6 and 9-11 have an integrated fluid feed system and are configured to dispense fluid either from a permeable surface, like the nozzles shown in FIGS. 3-6 or the nip between the pair of counter-rotating rollers shown in FIGS. 9 and 10. In other examples, a roller, such as the single roller embodiment shown in FIG. 11, may have through holes and fluid may be drawn through the through holes of the rollers by one of the example fluid feed systems shown in FIGS. 7 and 8 to dispense a precise amount of fluid.

Any of the above described spray deposition systems can further enhance the control and precision of the size and volume of the droplets generated. For example, the fluid or any of the surfaces of the fluid feed system and/or the opposing surface can be acoustically actuated to accelerate the development of capillary instability in the stretched fluid filaments. The vibrating surfaces and/or the pressure waves from the acoustic actuation can be used to control fluid filament formation, break-up and droplet size, which provides for greater precision throughout the process. Also, electric potential can be applied to opposing surfaces, such as two pistons or the single or double rollers fluid feed systems and opposing pistons or roller(s) surfaces. An applied electric potential also helps develop capillary instability in the fluid, which accelerates the fluid filaments to break into droplets. The applied electric potential can be tailored to precisely control when and how the fluid filaments are stretched and broken into droplets.

Still further, a coating can be applied to one or more surface, such as the surface of any of the disclosed fluid feed systems and/or surfaces that come into contact with the fluid. The coatings can either maximize or minimize fluid adhesion to the coated surface to strategically guide where the fluid adheres to the surface and ultimately the manner in which the fluid is stretched. For example, in an example where the bottom surface is a piston, the surface can be coated to have a favorable interaction energy with the fluid so that the fluid easily wets and strongly adheres to the piston surface. If the piston surface is also roughened or otherwise textured, the additional texturing further improves the fluid's ability to wet and adhere to the surface of the piston. By changing the surface energies and/or the topologies of any surface to which the fluid wets and/or adheres, the rate at which the fluid filaments drains can be controlled. The drain rate of the fluid filament is an additional strain source for the fluid and controls the size and volume of droplets that are formed when the fluid filament exceeds its capillary break-up point and breaks into droplets.

Even further, the surface of the fluid feed system and/or the surface can be heated to locally or globally change the temperature of the fluid. The temperature change in the fluid changes the fluid's viscosity, density, and/or surface tensions and allows for more control over the break-up dynamics of the fluid.

Still further, the surfaces of the fluid feed system and/or the opposing surface can be altered to enhance and control the fluid filament formation and break-up. For example, the coating energies can be modified either mechanically, by changing the roughness of the surface for example, or chemically, by adding an anti-wetting or pro-wetting coating. Additionally, the surface geometries of either or both of the fluid feed system and the surface can be changed. For example, either or both of the fluid feed system and the surface have one or more protrusions and/or recesses. Different geometries are effective for different applications and the chosen geometry is determined by a number of factors including the fluid being atomized and the needs of the particular application.

Figure 12A:
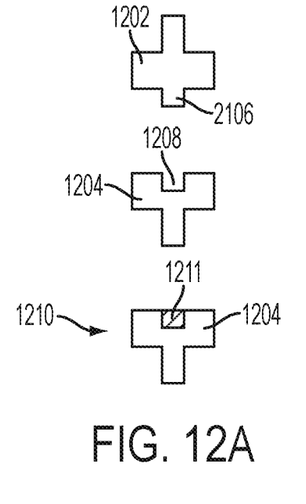

For example, any of the above disclosed spray deposition systems and methods can further include additional control elements to precisely control, enhance, or otherwise manipulate the fluid, the fluid filament stretching, and/or the generated droplets. For example, FIGS. 12A-12E show spray deposition systems with two pistons and one or both of the surfaces of the pistons is modified. FIG. 12A shows a pair of pistons 1202, 1204. The upper piston 1202 has a cube-shape protrusion 1206 extending away from approximately the center of its surface. The lower piston 1204 has a cube-shaped recess 1208 that mates with the cube-shaped protrusion 1206 of the upper piston 1202. FIG. 12A also shows the lower piston 1204 filled with fluid 1211. One or both of the pistons 1202, 1204 are moveable towards each other and the movement causes the protrusion 1206 to touch the fluid 1211 within the recess 1208. When the piston(s) 1202, 1204 move away from each other, the protrusion 1206 is coated with fluid 1211 and fluid filaments can be formed by stretching the fluid between the two pistons 1202, 1204 and can be strained to break into droplets in any of the manners discussed above.

FIGS. 12A-12H each shows a system with the lower piston either having a recess filled with fluid or a flat surface that is coated with the fluid. Alternatively or additionally, the upper piston can be coated with fluid or may have any of the permeable fluid feed systems discussed above. Any surface can be wetted or coated in any suitable manner and any desired integrated or non-integrated fluid feed system can be included.

Figure 12B:
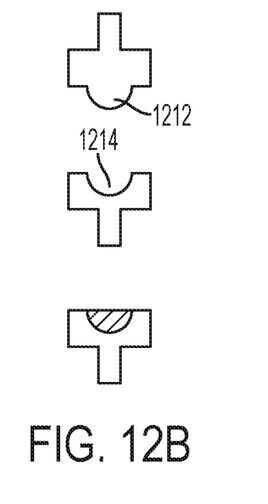
Figure 12C:
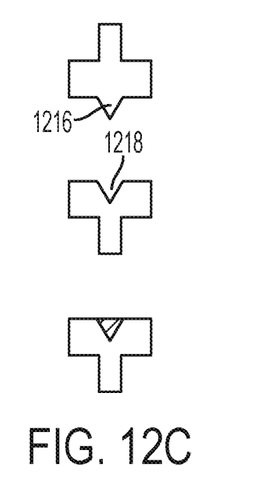

When the fluid is picked up from a cavity, as shown in the examples in FIGS. 12A-12F, the stretched fluid filament becomes pinned along the cavity edge due to the change in contact angle. The angle at the edge of the cavity can be shaped to promote fluid filament pinning, if desired. Also, a triangular or conical shaped protrusion, as shown in FIGS. 12C and 12G, can pick up fluid from a wetted flat surface or from a recess filled with fluid. The inclined face of the triangular/conical surface promote the flow of fluid to its point because of the low contact angle. The resulting fluid filament is confined to the pint of the triangle or cone shape and is much smaller than a filament formed from a flat surface. Still further, if the protrusion has inclined surface(s), such as the protrusions shown in FIGS. 12D and 12H, the fluid filament size is controlled by the plateau size.

Figure 12D:
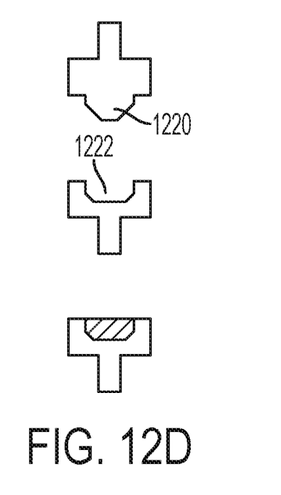
Figure 12E:
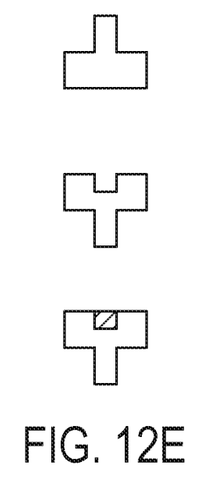
Figure 12F:
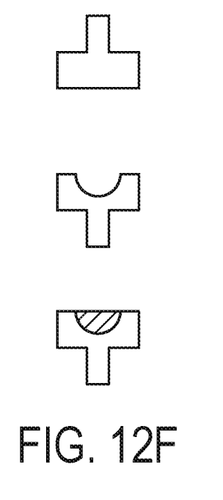
Figure 12G:
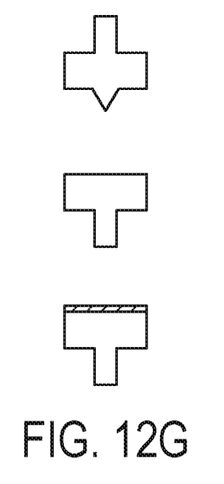

Any of the cavities shown in FIGS. 12A-12H control the amount of fluid available for stretching. The fluid feed system could be either a flat surface or a surface with a protrusion that mates with the recess. The shape of both the recess and the protrusion, if either or both exist, determines the manner in which the fluid is picked up and stretched. For example, FIGS. 12B-12D also have spray deposition systems with two pistons. As with the embodiment shown in FIG. 12A, the piston pairs in FIGS. 12B-12D also each have an upper piston with a protrusion that is shaped to mate with a recess in its respective lower piston. FIG. 12B shows an upper piston with a half-dome shaped protrusion 1212 and a lower piston with a mating half-dome shaped recess 1214. FIG. 12C shows an upper piston with a cone-shaped protrusion 1216 and a lower piston with a mating cone-shaped recess 1218. FIG. 12D shows an upper piston with a protrusion 1220 having inclined planes that meet at a plateau and a mating recess with declined planes that meet at a plateau 1222 in the lower piston.

Figure 12H:
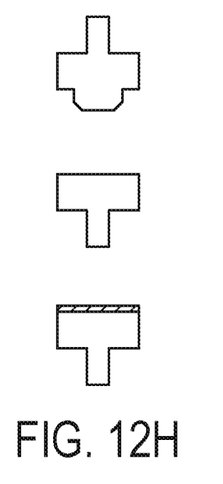

FIGS. 12E-12H each show a two piston spray deposition system in which one of the pistons has a flat surface and the other has either a protrusion or a recess, depending on the embodiment. FIG. 12E shows an upper piston with a flat surface that picks up fluid from a lower piston with a cube-shaped recess. FIG. 12F shows an upper piston with a flat surface that picks up fluid from a lower piston with a dome-shaped recess. FIG. 12G shows an upper piston with a cone-shaped protrusion that picks up fluid from a coated, flat lower piston. FIG. 12H shows an upper piston with a protrusion having inclined surfaces that meet at a plateau and a lower piston with a coated, flat piston surface.

Any of the above enhancements can be combined with one or more enhancement. For example, both an electric potential can be applied between the fluid feed system and the surface and various surface topologies can be used to precisely control the break-up dynamics of the fluid. The enhancements can be based on the type of fluid being atomized or other environmental or processing factors, as desired.

Similarly, any of the other above discussed embodiments could have a piston with a shaped or contoured surface. For example, the fluid feed systems having roller(s) can dispense fluid onto a piston with a recess of any desired shape and the fluid dispensed from the roller(s) can be stretched between the roller(s) and the shaped or contoured or otherwise textured piston. The piston surface could also be convexly rounded to mate with the round shape of the rollers in the single roller embodiments. Alternatively, the opposing piston surface can be generally flat and have protrusions that extend upwards towards the fluid feed system (the rollers in these examples or any other fluid feed system in other examples).

Methods of generating a controlled-volume of spray droplets are also disclosed. The methods include selectively dispensing fluid from a fluid feed system and stretching the dispensed fluid between the fluid feed system and a surface. The methods also cause the fluid filament to exceed its capillary break-up point and break into a volume of spray droplets. The volume of droplets is controlled by any of the methods discussed above. The methods use any of the fluid feed systems and surfaces discussed above to stretch fluid. One of both of the fluid feed system and the surface can be moveable with respect to each other in the process of dispensing and stretching the fluid. The fluid filament break-up can be accelerated by any of the methods discussed above including acoustically actuating the fluid and/or the fluid filament, applying an electric potential between the fluid feed system and the surface, and/or heating one or more of the fluid feed system, the fluid, the fluid filament, and the surface. Also, the surface energy and surface topology of the fluid feed system and/or the surface can be modified, as desired.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A controlled-volume spray deposition system, comprising:
   a fluid feed system comprising a pair of bi-directional, counter-rotating rollers to dispense fluid as a first surface, the rollers operable to rotate in a first direction to dispense the fluid through a nip defined by the pair of counter-rotating rollers;
   a second surface positioned to receive and come into contact with the fluid from the nip when the rollers rotate in the first direction, wherein the fluid sticks to the second surface; and
   the rollers operable to rotate in a second direction, wherein the motion of the rollers in the second direction retracts the fluid to cause the fluid to stretch between the first surface and the second surface and form a filament until the filament breaks to form a spray.

2. The system of claim 1, wherein the rollers are movable in a direction towards and away from the second surface.

3. The system of claim 1, wherein the second surface is movable in a direction towards and away from the first surface.

4. The system of claim 1, wherein the first and second surfaces are movable towards and away from each other.

5. The system of claim 1, wherein the second surface comprises a piston.

6. The system of claim 1, wherein the second surface comprises a second set of counter-rotating rollers.

* * * * *